July 26, 1960 E. BEYER 2,946,593

MAGNETIC RECORDING AND REPRODUCING EQUIPMENT

Filed July 21, 1953 4 Sheets-Sheet 1

Inventor
Eugen Beyer
by Michael S. Striker
Attorney

July 26, 1960 E. BEYER 2,946,593

MAGNETIC RECORDING AND REPRODUCING EQUIPMENT

Filed July 21, 1953 4 Sheets-Sheet 2

Inventor:
Eugen Beyer
By: Michael S. Striker
Attorney

July 26, 1960 E. BEYER 2,946,593

MAGNETIC RECORDING AND REPRODUCING EQUIPMENT

Filed July 21, 1953 4 Sheets-Sheet 3

Inventor:
Eugen Beyer
By: Michael S. Striker
Attorney

MAGNETIC RECORDING AND REPRODUCING EQUIPMENT

Filed July 21, 1953 4 Sheets-Sheet 4

Inventor:
Eugen Beyer
by: Michael S. Striker
Attorney 2,946,593

MAGNETIC RECORDING AND REPRODUCING EQUIPMENT

Eugen Beyer, Bismarckstr. 107, Heilbronn (Neckar), Germany

Filed July 21, 1953, Ser. No. 369,384

Claims priority, application Germany July 21, 1952

10 Claims. (Cl. 274—4)

The invention relates to magnetic recording and reproducing equipment, in particular equipment using flexible rectangular magnetic record sheets. The invention, moreover, is especially concerned with a machine of the type mentioned adapted for office dictation purposes.

The magnetic scanning devices of known construction have motion adapted to scan a helical track on the record sheet with the turns of the helix crossing the lapped edges of the sheet. After making a recording, the recorded intelligence may be transcribed, or the sheet may be removed for subsequent reinsertion for playing back, either in the same or a similar machine. Upon playback the magnetic head previously used for scanning is adapted to be used as a reproducing head. One of the objects of the present invention is to provide a novel type of mounting for the record sheet.

It is a further object of the invention to provide a recording and reproducing machine for record sheets into which such sheets may be fed without interrupting the recording or reproducing faculties.

It is still an additional object of the invention to have the machine run at even speed for recording, reproduction, loading and unloading.

It is still a further object of the invention to provide a fast and reliable device for feeding and ejecting record sheets.

With the foregoing objects in view, the invention consists of a machine for use with magnetic flexible record sheets, a rotatable supporting member adapted to transport a record during scanning, a magnetic scanning head adapted to engage a record so supported and positioned to subsequently scan a single path on the record, a mounting for said head, said head being adapted to transversely slide along said mounting during scanning, the circumference of the supporting member being of such a length that the edges of a record do not overlap but slide on an arcuate guide means so that the record is discharged when an outlet in the guide means is opened.

Figure 1:
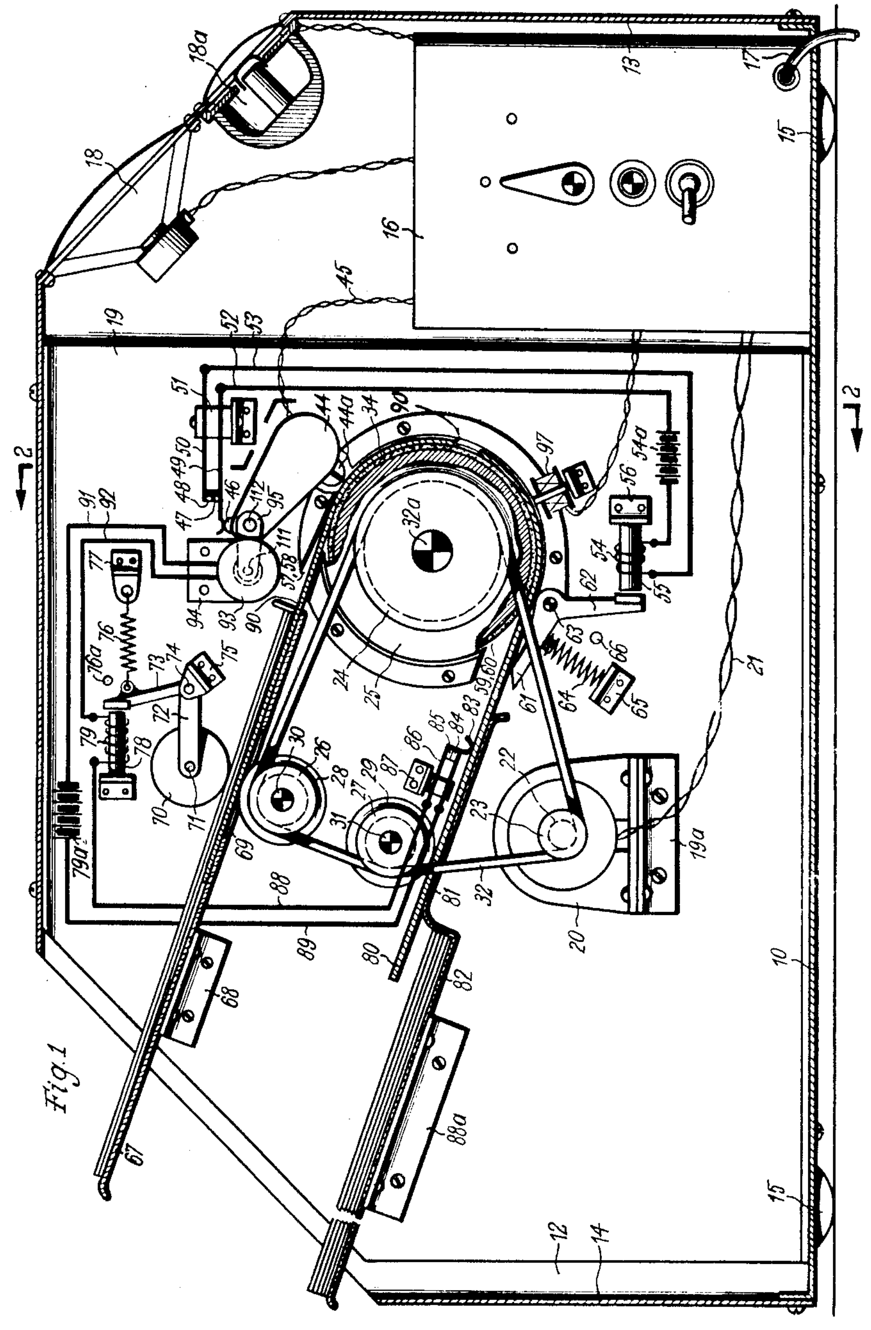
Figure 7:
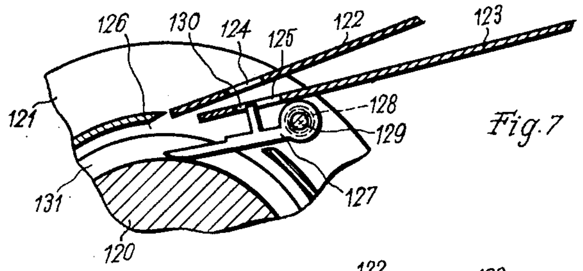
Figure 8:
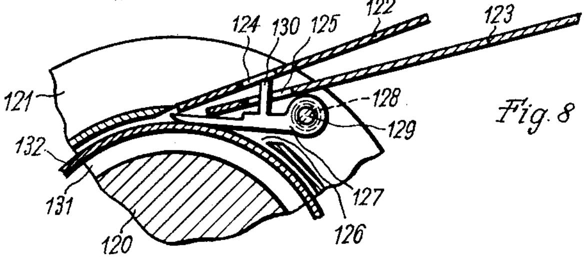
Figure 9:
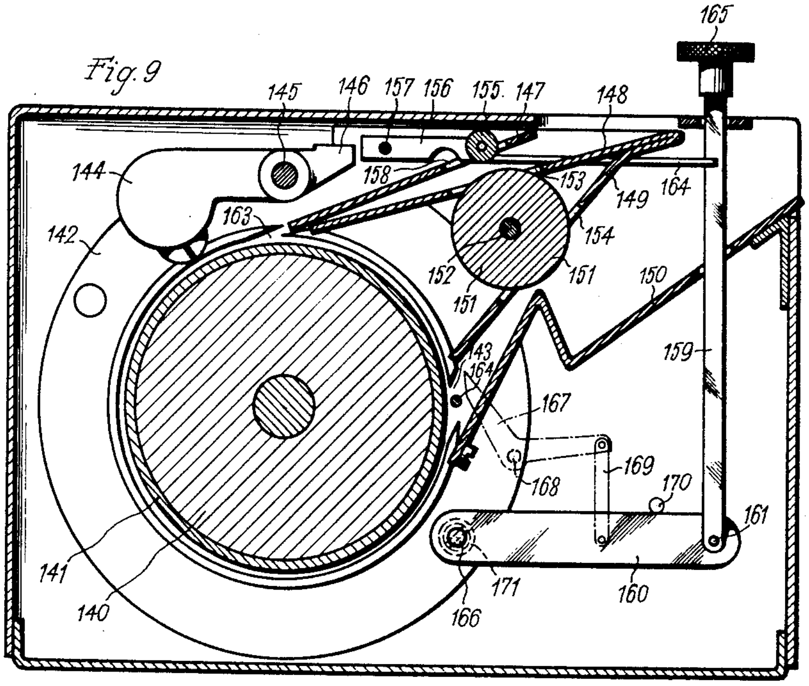
Figure 2:
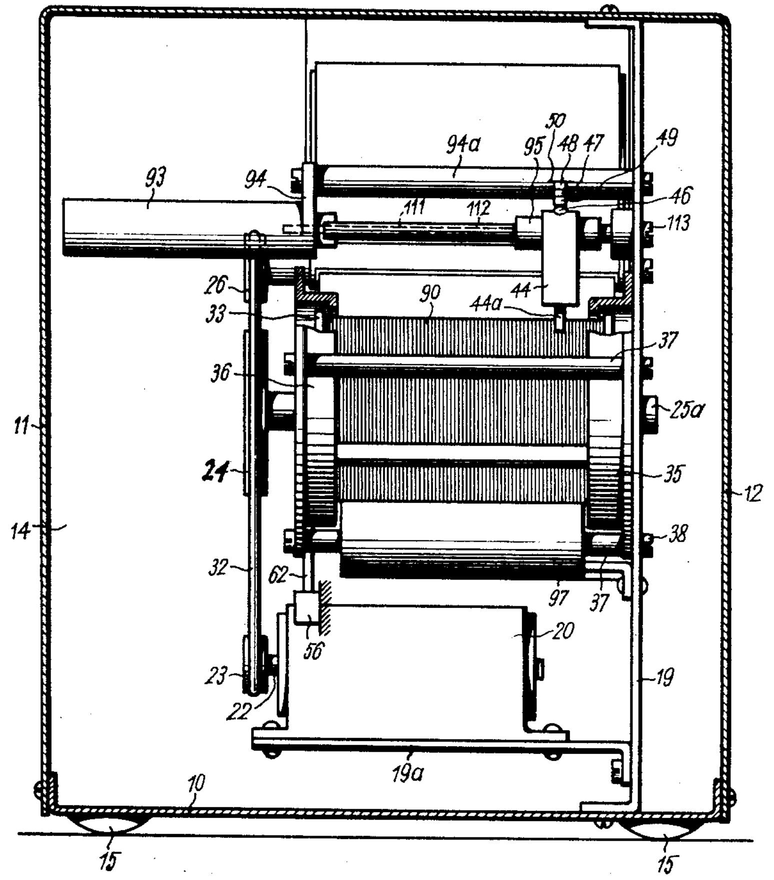
Figure 3:
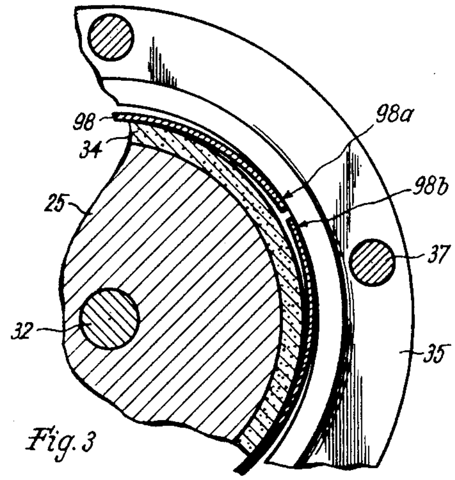
Figures 4, 5, 6:
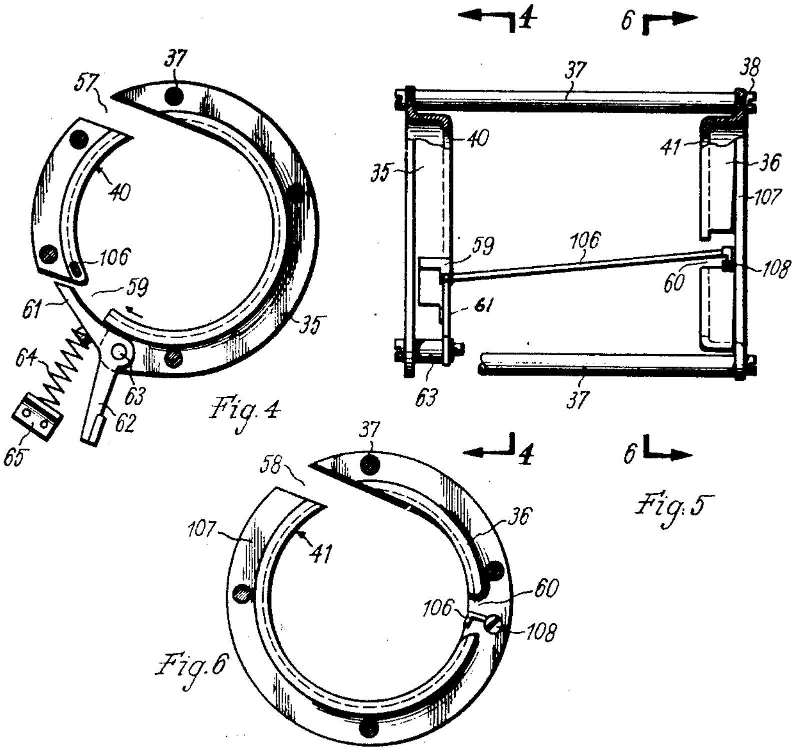

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic side view of a machine according to the invention with one side cover removed, Fig. 2 is a front view on line 2—2 of Fig. 1, Fig. 3 is a part section of a loaded drum on an enlarged scale, Fig. 4 is a side view of a first member of a holding arrangement as seen from line 4—4 of Fig. 5 on an enlarged scale as compared to Figs. 1 and 2, Fig. 5 is a front view of the holding arrangement on the same scale as Fig. 4, Fig. 6 is a side view of a second holding member as seen from line 6—6 of Fig. 5 on the same scale as Figs. 4 and 5, Fig. 7 is a part sectional view of a loading arrangement detail with the drum being unloaded, Fig. 8 is a part section according to Fig. 7 with the drum being loaded, Fig. 9 is a longitudinal section through a further embodiment of a loading and unloading arrangement.

Referring now to the drawing the machine is enclosed in a casing having a bottom plate 10, side plates 11 and 12, a front plate 13 and a rear plate 14, the entire casing being mounted on rubber feet 15. Mounted on the front plate 13 of the casing is the electrical equipment 16 of the machine which may be supplied with electric energy by a cord 17. On the front plate 13 also a microphone 18 and the loudspeaker **18*a*** are attached. As the entire electrical equipment forms no part of the invention it will not be described any further.

Mounted on a bracket **19*a* secured to a mounting plate 19 is an electrical motor 20 supplied with electric energy through leads 21. The shaft 22 of the motor carries a pulley 23 which is adapted to drive by means of a cord 32 a sheave 24 fixed to a drum 25 and two sheaves 26 and 27 attached to rolls 28 and 29 which are rotatably arranged on axes 30 and 31**. The purpose of these rolls will be explained further down.

The aforementioned drum 25 is together with sheave 24 rotatably mounted on an axis **32*a* fastened to the mounting plate 19 at 25*a* and is fitted with a pair of end flanges 33 which are clearly visible in Fig. 2, the flanges serving as positioning elements for the record sheet wrapped about the drum. The drum is formed of a non-magnetic material and carries a resilient surfacing indicated at 34. Arranged on both sides of the drum are guiding rings 35 and 36 which are rigidly held together by bolts 37 and screws 38 and also fastened by these means to the mounting plate 19. The shape of these rings which may best be seen from Figs. 4 to 6 is such that an inner edge 40 and 41 is spaced from the surface 34 of the drum a distance somewhat greater than the thickness of the recording sheet indicated at 90 in Fig. 1 and at 98** in Fig. 3.

Slidably and swingably arranged on a shaft 43 is a scanning head 44 biased towards the drum by means not shown to which a pair of conductors 45 is attached, said conductors connecting the scanning head 44 with the electrical equipment 16. The scanning head is transversely slidably arranged on a rod 112 fastened at 113 to the mounting plate 19. The scanning head 44 has a sliding shoe **44*a* and is fitted with a projection 46 which is adapted to close contact points 47 and 48 attached to leaf springs 49 and 50, the latter being mounted on an insulating support 51, with conductors 52 and 53 attached to the leaf springs which connect the springs and thus the contact points 47 and 48 to a coil 54 arranged on a magnetic core 55 attached to a support 56. A source of electric energy is provided at 54*a***.

Guiding rings 35 and 36 have slots 57 and 58 through which the record sheets may pass for loading and slots 59 and 60 through which the sheet may pass when being ejected. Slot 59 of ring 35 is during operation of the machine closed by an arm 61 of a latch 61/62 rotatably arranged on a fulcrum 63 whose other arm 62 made of soft iron may be attracted by core 55 when coil 54 is energized. A compression spring 64 held on its lower side on a support 65 is adapted to push latch 61/62 into its closed position with a stop member 66 limiting the motion.

The record sheets to be fed into the machine are stored on a reservoir 67 mounted to the casing at 68 and having a crosswise disposed aperture 69, one sheet 90 being fed according to Fig. 1. A roller 70 is rotatably mounted on an axis 71 attached to arms 72 of bell cranks 72/73 rotatably arranged on a pivot 74 held in a support 75. To the second arm 73 of the bell cranks 72/73 a tension spring 76 is attached whose other end is secured to a support 77, said spring being adapted to turn the bell cranks in clockwise direction according to Fig. 1 and thus lift the roller 70 away from the reservoir 67 with a stop member 76a limiting the motion of the bell cranks. An electromagnet consisting of a core 78 and a coil 79 is adapted when energized to swing the bell cranks 72/73 in anti-clockwise direction against the action of spring 76. A source of energy to the electromagnet is provided at 79a.

The sheet 80 which is being ejected as seen in Fig. 1 passes along a guiding plate 81 and is deposited in a storage container 82 secured to the casing at 83a where a plurality of sheets is already deposited as may be seen from Fig. 1. During ejection sheet 80 passes below a leaf spring 83 having a feeler pressing on said sheet and carrying a contact point 84 opposite of which a second contact point 85 fixed to a leaf spring 86 is arranged, the leaf springs being secured to an insulating support 87 and connected by a conductor 88 to coil 79 and by a conductor 89 to the source of electric energy 79a, from which a conductor 91 leads to a further electromagnet which is connected by conductor 92 to coil 79.

This electromagnet is equipped with a coil 93 secured to a rod 94a fastened to mounting plate 19 by a bracket 94 and is fitted with a core 111 connected to the scanning head 44 by means of a link 95.

An erasing head 97 is arranged for erasing the intelligence on the record, said head being known per se and forming no part of the invention.

When a record 98 is arranged on the drum (see Fig. 3) the record has the tendency to straighten and in doing so presses with its edges 98a and 98b against the guiding rings 35 and 36 with the result that the friction between the record sheet 98 and the surface 34 of the drum is great enough to carry the record along with the rotating drum without any slip. It will be noted that the edges of the record sheet do not abut but are arranged at a slight distance. This small distance is in no way detrimental to the function of the record. The edges may of course abut but by no means overlap as otherwise the loading and ejecting of record sheets will no longer function.

Referring now to Figs. 4 to 6 it will be seen that only guiding ring 35 is fitted with a latch or closure means 61/62 while guiding ring 36 is provided with a slot 60. A elongated retaining wire element 106 connects the tip of ring 35 to the flange 107 of ring 36 where the wire is secured by means of a screw 108, the slots 59 and 60 being arranged at different locations of the circumferences of the rings so that the retaining wire is disposed at an angle to the axis of the drum. This wire insures the retention of the record sheet when closure means 61/62 is in its closed position as shown in Fig. 4.

The operation of the machine as far as it forms part of the invention will now be described.

When motor 20 runs at even speed, drum 25, roll 28 and roll 29 will be driven by means of cord 32 at a definite uniform rate. Assuming that a record sheet 98 is loaded on the drum (Fig. 3) the latter will carry along the sheet without any slip by the frictional effect on its surface 34. At the outset the recording head 44 will be at the left side as shown in Fig. 2 and will ride in the helical tracks of the record sheet which is confined during its movement by guide faces 40, 41 and by the closed guide portion 61 of closure means 61, 62, whereby the head will continuously be moved transversely along rod 112 towards the right. At a certain position, i.e. when head 44 has arrived at the right end of the loaded sheet, projection 46 provided on the head will close the contact points 47 and 48 and thus close the circuit of coil 54 so that guide portion 61 of closure means 61/62 will be attracted and the slot 59 opened by swinging guide arm 61 downward. When the leading edge of the record 80 passes, while being on drum 25, slot 59, it will then due to its straightening tendency leave the drum through this slot and also slot 60 beneath the elongated wire element 106 (see Fig. 5), pass on to plate 81 and in doing so close contact points 84 and 85 whereby the circuit for coils 79 and 93 will be completed. Now roll 70 will be pressed upon the sheets in reservoir 67 with the result that the revolving roll 28 will carry the lowermost record sheet along on to drum 25 which is reached shortly behind the trailing edge of the record sheet 80 being ejected. At the same time head 44 is returned into its initial position under the action of coil 93, this motion being preferably timed in such a manner that the head slides back along the space between the two sheets 80 and 90 or it may be slightly lifted when crossing a sheet.

As soon as the ejected sheet 80 has passed leaf spring 83, due to the action of roll 29, contacts 84 and 85 will open, whereupon latch 61/62 returns to its closing position under the action of spring 64 and roll 70 is lifted under the action of spring 76. This motion must be finished shortly before the leading edge of the sheet 90 passes slot 59 and 60, the former being then closed by latch 61/62. The closing of latch 62 is delayed until the ejected sheet has cleared the outlet. Switch 84, 85 exercises direct control on latch 61, 62 since it actuates the electromagnetic means 93 and thereby shifts the projection 46 which controls through contacts 47, 48 the electromagnetic means 54 operating closure latch 61, 62.

In Figs. 7 and 8 a device is shown by means of which it is assured that further sheets may not be fed when the drum is loaded.

The drum is shown at 120 having at its end a ring-shaped recess 131. A guiding ring is shown at 121 having a slot 126 for admission of the record sheet. Fastened to the ring and the casing are two guiding plates 122 and 123 forming a channel through which the sheet is passed while being fed, the plates having apertures 124 and 125. Secured to the ring 121 is a stop lever 127 which a torsional spring 128 tries to turn in clockwise direction according to Figs. 7 and 8, said stop lever being pivoted at 129 and being fitted with a projection 130 adapted to pass through the apertures 122 and 123 into the feeding channel.

The operation of this device is as follows:

When the drum 120 is not loaded the stop lever 127 rests on the drum, i.e. on the inner surface of recess 131. The projection 130 will then not protrude into the feeding channel as shown in Fig. 7. When a record sheet 132 is placed on the drum 120, the stop lever 127 will no longer rest on the drum but on this sheet 132, with the result that the projection 130 protrudes through apertures 124 and 125, thus barring the admission of a new sheet to the drum. The edge 98a of the record sheet easily slides underneath head 44a and cannot be caught in the inlet opening 57, 58 since the edges of the inlet openings are forwardly inclined to the radial direction for guiding the record sheet to the guide face 40, as shown in Figs. 4 and 6.

Whilst in Figs. 1 and 2 a fully automatic machine is shown, Fig. 9 illustrates a semi-automatic loading arrangement.

A drum is denoted by 140, the outside surface layer of the drum by 141 and one of the guiding rings by 142, the latter having an inlet opening 163 and an outlet opening at 143 where the crosswise arranged wire 164 similar to Fig. 5 is seen. A head 144 may be shifted by hand along a rail 145 by pressing on a lever 146. Two guiding plates 147 and 148 serve to feed the record sheet towards slot 163 of the guiding ring and two plates 149 and 150 serve to pass the ejected sheet away from the drum. A roll 151 mounted on an axis 152 is driven by a motor, not shown, at constant speed, said roll reaching with its upper and lower surfaces through apertures 153 and 154 into the feeding and ejecting channels. A small roll 155 is rotatably attached to a lever 156 pivoted at 157 to part of the frame, the roll 155 reaching with its lower surface through an aperture 158 into the feeding channel. A resilient wire 164 attached to lever 156 is connected to a rod 159 carrying a push button 165 with a lever 160 pivoted to that rod at 161, said lever 160 being pivotally connected to ring 142 at 166. A latch 167 shown in dot-dash lines corresponding to latch 61/62 of Figs. 1 to 7 to close the ejecting aperture of a guiding ring is pivoted at 168 and connected to lever 60 by means of a link 169. A torsional spring 171 attempts to turn lever 160 in anticlockwise direction according to Fig. 9 with a stop member 170 limiting this motion.

When a new record sheet is to be inserted said sheet is fed into the channel between plates 147 and 148 whereupon the push button 165 is depressed, said button swinging lever 156 and roll 155 downward by means of wire 164 so that the record sheet is gripped and fed forward. At the same time latch 167 is opened so that the loaded sheet will eject through slot 143 into the channel between plates 149 and 150. This action continues even though the push button is released until the one sheet is ejected and the next one loaded, because the drum will carry the ingoing sheet and roll 151 the outgoing sheet along. The scanning head 144 may be returned by hand by lifting and pushing lever 160.

The invention may be employed to advantage in connection with sheets of the same type of helical tracks, which necessitates the returning of the scanning head to its initial position, or of sheets having helical tracks of opposite hands being alternately fed into the machine. In the latter case the scanning head will start at the new sheet at the place where it has finished scanning the last sheet.

The distance between the leading and the trailing edges of a loaded record may be considerable and at least so great that the distance corresponds to ⅕ of a second scanning time.

As will be seen from the foregoing, the speeds of the loaded sheet and of the sheets being fed and ejected are equal and it is thus possible to employ the machine according to the invention for continuous recording or reproduction, the operation being fully automatic, semi-automatic or manual.

Without further analysis, the foregoing will so fully reveal the gist of the present invention that others can by applying current knowledge readily adapt it for various applications without omitting features that, from the standpoint of the prior art, fairly constitute essential characteristics of the generic of specific aspects of this invention and, therefore, such adaptations should and are intended to be comprehended within the meaning and range of equivalence of the following claims.

What is claimed as new and desired to be secured by Letters Patent is:

1. In an apparatus of the type described, in combination, rotary transporting means for transporting a flexible resilient record sheet tending to assume a straight position; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets; and closure means located at said outlet and having a guide portion, said closure means and said guide portion having a closed position in which said guide portion is spaced in radial direction said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; and operating means for operating said closure means.

2. In an apparatus of the type described, in combination, rotary transporting means for transporting a flexible resilient record sheet tending to assume a straight position; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets, said guide means further including an elongated element flush with said guide face, said elongated element extending substantially in axial direction of said transporting means inclined to the axis of same and having one end located forwardly and the other located rearwardly in direction of rotation of said transporting means, said elongated element having said rearwardly located end located forwardly of said outlet and adjacent to same in direction of rotation of said transporting means; closure means located at said outlet and having a guide portion, said closure means and said guide portion having a closed position in which said guide portion is spaced in radial direction said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided by said guide portion and by said elongated element is discharged through said outlet; and means for operating said closure means.

3. In an apparatus of the type described, in combination, rotary transporting means for transporting a flexible resilient record sheet tending to assume a straight position, said record sheet having helical grooves; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets; closure means located at said outlet and having a guide portion, said closure means and said guide portion having a closed position in which said guide portion is spaced in radial direction said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; operating means for operating said closure means; and a scanning head movable in axial direction of said transporting means between two end positions and having means for engaging the helical grooves of each transported record sheet so that said scanning head is moved from one of said end positions to the other of said end positions while said transporting means repeatedly transport the record sheet along said guide face and guide portion.

4. In an apparatus of the type described, in combination, rotary transporting means for transporting a flexible resilient record sheet tending to assume a straight position, said record sheet having helical grooves; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets; closure means located at said outlet and having a guide portion, said closure means and said guide portion having a closed position in which said guide portion is spaced in radial direction said predetermined distance from said transporting means and is flush with said guide face and continues the same in said outlet so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; operating means for operating said closure means; a scanning head movable in axial direction of said transporting means between two end positions and having means for engaging the helical grooves of each transported record sheet so that said scanning head is moved from one of said end positions to the other of said end positions while said transporting means repeatedly transport the record sheet along said guide face and guide portion; shifting means for returning said scanning head from said other end position to said one end position; and means for actuating said shifting means and including a member adapted to be operated by a record sheet discharged through said outlet so that said shifting means returns said scanning head when a record sheet is discharged in said discharge position of said closure means.

5. In an apparatus of the type described, in combination, rotary transporting means for transporting a flexible resilient record sheet tending to assume a straight position, said record sheet having helical grooves; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets; closure means located at said outlet and having a guide portion, said closure means and said guide portion having a closed position in which said guide portion is spaced in radial direction said predetermined distance from said transporting means and is flush with said guide face and continues the same in said outlet so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; operating means for operating said closure means; a scanning head movable in axial direction of said transporting means between two end positions and having means for engaging the helical grooves of each transported record sheet so that said scanning head is moved from one of said end positions to the other of said end positions while said transporting means repeatedly transport the record sheet along said guide face and guide portion; shifting means for returning said scanning head from said other end position to said one end position; and electrical means for actuating said shifting means and said operating means, and including a switch member adapted to be operated by a record sheet discharged through said outlet so that said shifting means returns said scanning head when a record sheet is discharged in said discharge position of said closure means.

6. In an apparatus of the type described, in combination, rotary transporting means for transporting a flexible resilient record sheet tending to assume a straight position; drive means for rotating said transporting means in one direction of rotation; guide means including a pair of axial spaced guide rings, each guide ring having an arcuate guide face surrounding at least an axial section of said transporting means, said arcuate guide faces being spaced in radial direction from said rotary transporting means a predetermined distance so that the leading and trailing edges of a transported record sheet engage said guide faces during rotation of said transporting means while being slightly spaced apart whereby said record sheet is bent into a curved position, each guide face having an inlet for record sheets, and an outlet for record sheets; closure means located at one of said outlets and having a guide portion, said closure means and said guide portion having a closed position in which said guide portion is spaced in radial direction said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; and operating means for operating said closure means.

7. In an apparatus of the type described, in combination, rotary transporting means for transporting a flexible resilient record sheet tending to assume a straight position; drive means for rotating said transporting means in one direction of rotation; guide means including a pair of axial spaced guide rings, each guide ring having an arcuate guide face surrounding at least an axial section of said transporting means, said arcuate guide faces being spaced in radial direction from said rotary transporting means a predetermined distance so that the leading and trailing edges of a transported record sheet engage said guide faces during rotation of said transporting means while being slightly spaced apart whereby said record sheet is bent into a curved position, each guide face having an inlet for record sheets, and an outlet for record sheets, said outlets being spaced in direction of rotation of said transporting means, said guide means further including an elongated element flush with said guide face, said elongated element extending substantially in axial direction of said transporting means inclined to the axis of same and having one end located forwardly and the other located rearwardly in direction of rotation of said transporting means, said elongated element having said ends located forwardly of said outlets and adjacent to same in direction of rotation of said transporting means; closure means located at one of said outlets and having a guide portion, said closure means and said guide portion having a closed position in which said guide portion is spaced in radial directon said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided by said guide portion and by said elongated element is discharged through said outlet; and operating means for operating said closure means.

8. In an apparatus of the type described, in combination, rotary transporting means for transporting a flexible resilient record sheet tending to assume a straight position; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets; closure means located at said outlet and having a guide portion, said closure means and said guide portion having a closed position in which said guide portion is spaced in radial direction said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; operating means for operating said closure means; a feeding channel means located opposite said inlet for guiding record sheets for said inlet; a discharge channel means located opposite of said outlet for guiding discharged record sheet; a rotary transporting roller projecting into said feeding and ejecting channel means; a feeding roller movable between an inoperative position and an operative position cooperating with said transporting roller for feeding record sheets to said inlet; and means for operating said feeding roller between said positions of the same.

9. In an apparatus of the type described, in combination, rotary transporting means for transporting a flexible resilient record sheet tending to assume a straight position; drive means for rotating said transporting means in one direction of rotation; guide means including an arcuate guide face surrounding at least an axial section of said transporting means, said arcuate guide face being spaced in radial direction from said rotary transporting means a predetermined distance so that the leading and trailing edges of a transported record sheet engage said guide face during rotation of said transporting means while being slightly spaced apart whereby said record sheet is bent into a curved position, said guide means having an inlet for record sheets, and an outlet for record sheets; closure means located at said outlet and having a guide portion said closure means and said guide portion having a closed position in which said guide portion is spaced in radial direction said predetermined distance from said transporting means and is flush with said guide face and continues the same in said outlet closing the same so that in said closed position of said closure means a record sheet fed through said inlet is repeatedly moved by said transporting means along said annular guide face and said guide portion, said closure means and said guide portion being movable to a discharge position in which said guide portion is located substantially in a tangential plane with respect to said guide face whereby a transported record sheet guided along said guide portion is discharged through said outlet; operating means for operating said closure means; feeding means for feeding a record sheet through said inlet to said transporting means; and actuating means for actuating said feeding means and including a member located adjacent said outlet and adapted to be actuated by a partly ejected record sheet so that a newly fed record sheet is fed with its leading edge directly following the trailing edge of the discharged record sheet.

10. An apparatus as set forth in claim 9 and including stop means mounted on said guide means adjacent said inlet and being movable from a normal position to a blocking position blocking said inlet, said stop means being adapted to move from said normal position to said blocking position when engaging a transported record sheet for preventing feeding of a record sheet while the trailing end of another record sheet is located opposite said inlet.

References Cited in the file of this patent

UNITED STATES PATENTS

| | | |
|---|---|---|
| 2,253,052 | Schubert et al. | Aug. 19, 1941 |
| 2,394,577 | Wise | Feb. 12, 1946 |
| 2,431,360 | Philpott | Nov. 25, 1947 |
| 2,451,080 | Finch et al. | Oct. 12, 1948 |
| 2,672,346 | Roberts | Mar. 16, 1954 |
| 2,729,453 | Camras | Jan. 3, 1956 |